United States Patent [19]

Yasujima et al.

[11] 4,254,337
[45] Mar. 3, 1981

[54] INFRARED INTERFERENCE TYPE FILM THICKNESS MEASURING METHOD AND INSTRUMENT THEREFOR

[75] Inventors: Akitaka Yasujima, Yokohama; Shingo Ishikawa, Kawasaki, both of Japan

[73] Assignee: Asahi-Dow Limited, Tokyo, Japan

[21] Appl. No.: 70,555

[22] Filed: Aug. 29, 1979

[30] Foreign Application Priority Data

Sep. 4, 1978 [JP] Japan ................................. 53-107547

[51] Int. Cl.³ ............................................... G01J 1/00
[52] U.S. Cl. ................................... 250/339; 250/341; 356/357
[58] Field of Search ....................... 250/338, 339, 341; 356/355, 357

[56] References Cited

U.S. PATENT DOCUMENTS

| 3,238,839 | 3/1966 | Day, Jr. | 356/355 |
|---|---|---|---|
| 3,601,492 | 8/1971 | Reichard | 356/357 |
| 3,631,526 | 12/1971 | Brunton | 250/338 |
| 3,693,025 | 9/1972 | Brunton | 250/339 |
| 3,854,044 | 12/1974 | Stay et al. | 250/339 |
| 3,973,122 | 8/1976 | Goldberg | 250/338 |
| 4,027,161 | 5/1977 | Williams et al. | 250/339 |

Primary Examiner—Davis L. Willis
Attorney, Agent, or Firm—Sughrue, Rothwell, Mion, Zinn and Macpeak

[57] ABSTRACT

An infrared light is applied to a polymer film having a thickness of less than 30µ, and the infrared light is spectroscopically separated before or after being applied to the polymer film to obtain an infrared interference fringe spectrum based on the polymer film, and then the extreme points of the infrared interference fringe spectrum are detected by processing, whereby to measure the thickness of the polymer film.

17 Claims, 8 Drawing Figures

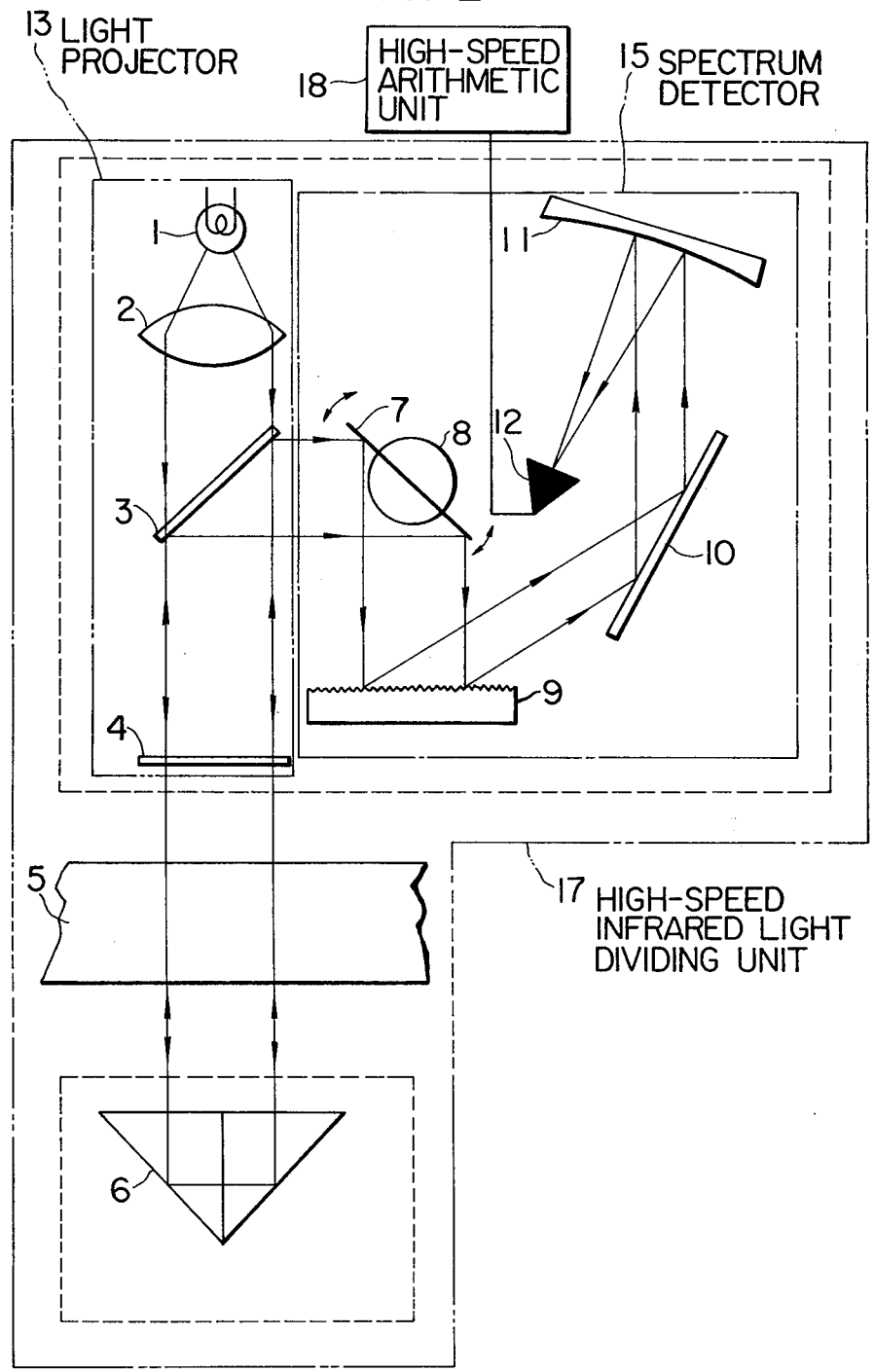

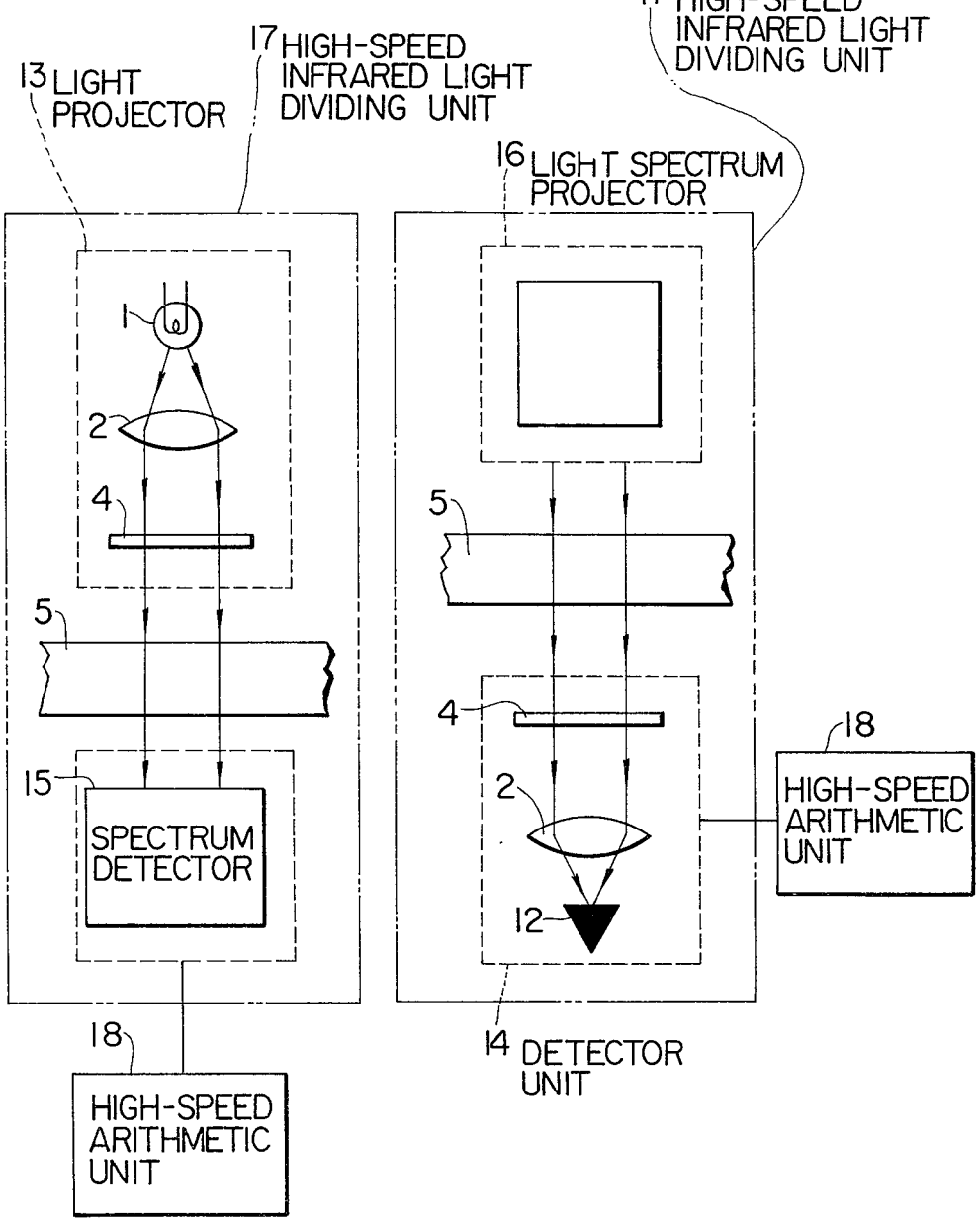

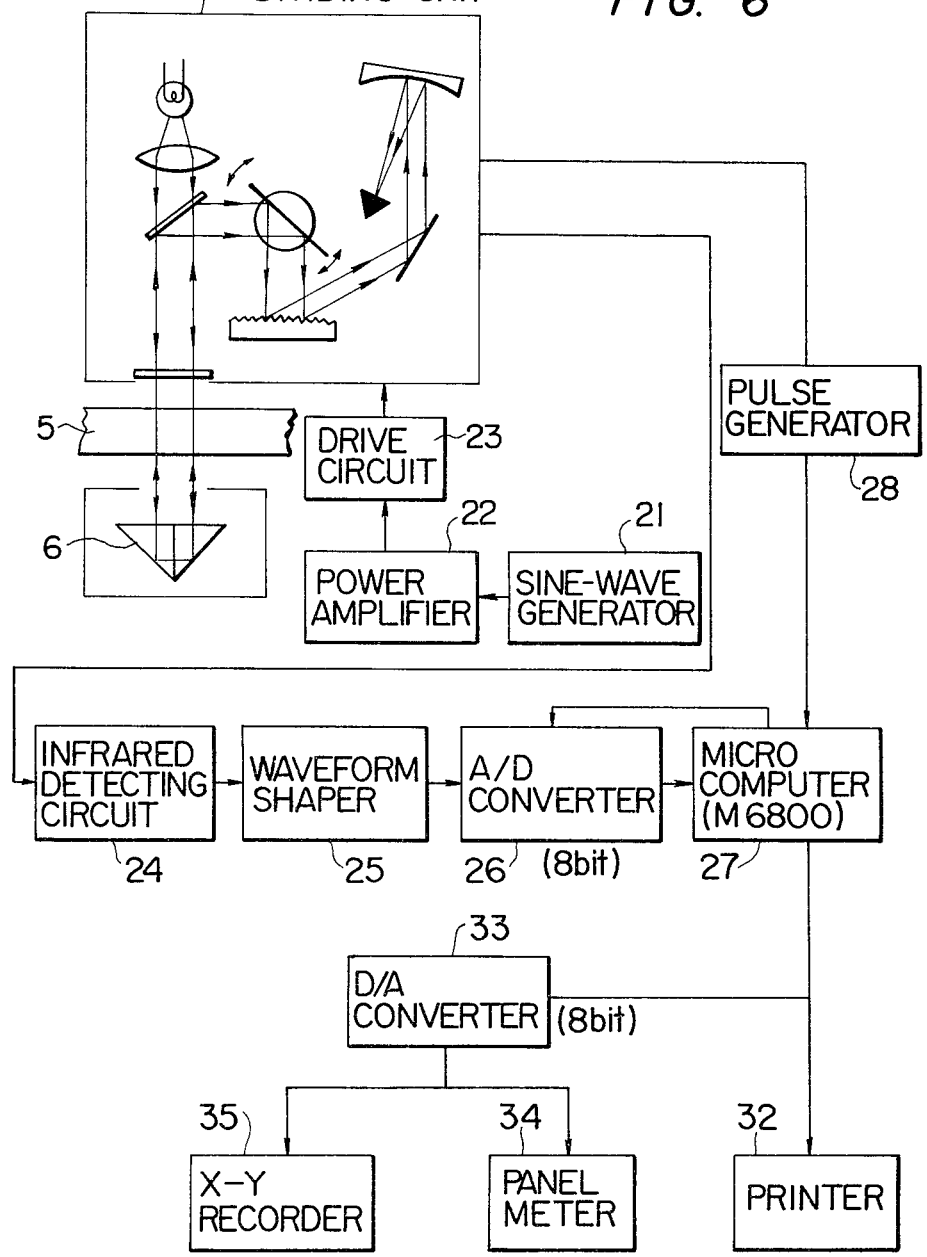

INFRARED INTERFERENCE TYPE FILM THICKNESS MEASURING METHOD AND INSTRUMENT THEREFOR

BACKGROUND OF THE INVENTION

This invention relates to an infrared interference type film thickness measuring method and instrument for measuring the thickness of a thin polymer film by utilizing an interference fringe of an infrared light caused by the film.

For continuous, on-line non-contacting measurement of the thickness of a polymer film on the film manufacturing production line, the following two methods have widely been employed:

(1) A method of measuring the thickness of the polymer film utilizing absorption and scattering of beta rays by the film;

(2) A method of measuring the thickness of the polymer film utilizing absorption of infrared rays by the film.

However, the abovesaid two methods have the following defects:

The method utilizing beta rays has the defect that as the thickness of the polymer film to be measured decreases, that is, when the film thickness is less than about 10 to 30$\mu$, an appreciable error is produced between the measured thickness and the actual one. That is, this method is to make use of absorption and scattering of beta rays corresponding to the weight of the member to be measured, so that the film thickness is measured by dividing the weight of the film per unit area by the density of the film. Therefore, no problems occur when the member to be measured is a metal or the like which has a high density; but in the case of a polymer film whose density is close to 1, its weight is very small, and the rate of beta rays being absorbed and scattered by the film becomes very low, so that the measurement is greatly affected by the absorption and scattering of the beta rays by air and variations in the intensity of the beta ray source which stem from a statistical decay of beta rays. As a consequence, in the case of using beta rays for the film thickness measurement, variations in the scattering and absorption of beta rays resulting from changes in the thickness of the polymer film are measured with low SN ratio (signal-to-noise ratio); in particular, measurement of the thickness of a thin polymer film is difficult.

The method utilizing infrared radiation is safe and superior, as a method of measuring the thickness of a polymer film, to the method using beta rays because it employs infrared rays unsusceptible to the influence of air in place of radiation such as beta rays. This method adopts the principle of measuring the thickness of a film utilizing absorption of chromatic infrared light by the film corresponding to its thickness. Consequently, in the case of measuring the thickness of a thin polymer film, when the film comes to satisfy the condition of interference of a parallel-surfaced thin film, the infrared light cast thereon undergoes multiple reflection in the film to cause a light interference phenomenon, and when the film thickness varies, the interference condition changes, and the infrared light transmitted through the film becomes light when light rays are in-phase, and dark when the rays are out-of-phase. This variation in the intensity of the infrared light is utterly undistinguishable from the variation in the absorption of the infrared light by the polymer film corresponding to the film thickness, resulting in a large error in the measured film thickness. Accordingly, with the method utilizing the chromatic infrared light corresponding to the wavelength at the peak of absorption by the polymer film, it is difficult to measure the thickness of a polymer film, which causes marked light interference, whose thickness is very small and whose surfaces are highly parallel and flat and lustrous and which has a high degree of transparency.

Accordingly, in connection with the method for film thickness measurements utilizing the infrared absorption, there have heretofore been made various inventions for reducing the interference phenomenon by infrared radiation in a thin film which causes an error in the measurement, as seen from U.S. Pat. Nos. 3,631,526, 3,693,025, 3,973,122 and 4,027,161.

There has been known, in general, a method of measuring the film thickness by making use of the light interference phenomenon by a film. For example, U.S. Pat. No. 3,238,839 discloses a method of measuring the thickness of a thermoplastic film utilizing the interference. In this patent, as described in its patent gazette, col. 4, lines 14–16, the wavelengths of light used for measurement are between 0.435 and 0.546$\mu$, which are visible rays of light. In the case of using such visible light, the measurement is liable to be affected by external light and becomes less reliable and requires a complicated measuring instrument. Further, as the wavelength used becomes shorter, the amplitude and period of the resulting interference waveform decrease; namely, the interference waveform becomes hard to obtain, so that the measurement becomes difficult by that. Moreover, in this patent the interference waveform is displayed, and the operator counts the wave number N from the display, and the wave number N is used for calculation to obtain the film thickness. That is, the measuring instrument of this patent does not provide directly the film thickness as the measured result but requires counting of the wave number N by the operator. Accordingly, such a method is not suitable for on-line measurement of the thickness of a film moving on the manufacturing production line. On top of that, the measuring instrument is fixed, so that it is impossible to measure the thickness of the moving film over the entire width thereof.

U.S. Pat. No. 3,601,492 also discloses apparatus for measuring film thickness utilizing the interference phenomenon. This apparatus is to measure the thickness of a silicon wafer by making use of interference of an infrared light, and the interference fringe obtained is displayed on an oscilloscope and marker lines are set visually at the displayed interference fringe. Since the marker lines are set by the eye, the measured value varies for each setting and according to the particular operator, resulting in inaccurate measurement; furthermore, since manual operation is needed, the measurement is time-consuming and hence low in measuring speed. Moreover, the member to be measured and the measuring instrument are both fixed, so that it is impossible to measure the thickness of a moving member while moving the measuring instrument relative thereto. The infrared wavelength used in this patent is in the range of 11 to 35 $\mu$m. This wavelength range is one that if it is used for measuring the thickness of a polymer film, there exist a number of strong characteristic absorbing peaks according to the particular polymer film; therefore, there is a fear that the measurement cannot be achieved.

An object of this invention is to provide an infrared interference type film thickness measuring method and instrument with which it is possible to measure, with high accuracy, the thickness of a thin polymer film such that when it is measured by the method utilizing beta rays, a large error is resulted in the measurement and that also when it is measured by the method utilizing infrared absorption, a large error is produced in the measurement due to the interference phenomenon.

Another object of this invention is to provide an infrared interference type film thickness measuring method and instrument which permits measurement of the film thickness with substantially no manual operation.

Still another object of this invention is to provide an infrared interference type film thickness measuring method and instrument with which it is possible to continuously measure, with high accuracy the thickness of a moving polymer film in a non-contacting manner.

SUMMARY OF THE INVENTION

According to this invention, a polymer film less than $30\mu$ in thickness which is to be measured is irradiated by infrared light, and the infrared light before or after irradiation is spectroscopically divided to obtain an infrared interference fringe spectrum based on the polymer film, and at least extreme points of the infrared interference fringe spectrum are detected by arithmetic processing, thereby to measure the thickness of the polymer film.

For facilitating a better understanding of the invention, a description will be given first of the principles of the film thickness measurement employing the infrared interference phenomenon, though they are well-known in the art.

It is well known that in a thin film whose front and rear surfaces are parallel to each other (which film will hereinafter be referred to as a parallel-surfaced thin film), a light interference occurs due to multiple reflection of light. Where light is incident on the parallel-surfaced thin film perpendicularly thereto, the condition that the transmitted light and the reflected light are respectively made maximum and minimum by the parallel-surfaced thin film is expressed by the following equation:

$$2nd = (N + \tfrac{1}{2})\lambda \qquad (1)$$

The condition that the transmitted light and the reflected light are respectively made minimum and maximum is given by the following equation:

$$2nd = N\lambda \qquad (2)$$

In the equation (1) and (2), n is the refractive index of the parallel-surfaced thin film, d is the film thickness, N is a positive integer (the degree of the interference fringe) and $\lambda$ is the wavelength of light. As is seen from the equations (1) and (2), interference fringes are produced at the following equal wave number intervals:

$$\Delta \nu = 1/2nd \qquad (3)$$

and, as is well-known in the art, by measuring the wave number interval $\Delta\nu$, the film thickness d is measured. That is, $$d = \frac{1}{2n\Delta\nu} = \frac{m}{2n}\left(\frac{\lambda_A \lambda_B}{\lambda_A - \lambda_B}\right) \qquad (4)$$

where $\lambda_A$ and $\lambda_B$ are wavelengths of light which satisfy the equations (1) and (2), and m is a difference in the degree between interference fringes and corresponds to a difference in the value of N between the cases of $\lambda_A$ and $\lambda_B$ in the equation (1) or (2).

The above has shown the condition of the interference fringe in the parallel-surfaced thin film and the well-known relationship between the interference fringe and the film thickness. When the thickness of a polymer film which is to be measured by the method of this invention is thin (less than $30\mu$ though it differs with the kind and optical condition of the polymer film), such a state as described above in respect of the parallel-surfaced thin film is resulted, and such a clear interference fringe as shown in FIG. 1 is produced. This is an example of an infrared light spectrum of a $10.5\mu$ thick polyvinylidene chloride film. Such a clear interference is formed by an internal multiple reflection in the film. Accordingly, based on the fact that when a thin plastic film satisfies the interference condition of the parallel-surfaced thin film, an infrared interference is caused in the infrared region to produce an interference fringe, the present invention utilizes the interference fringe in the infrared region to measure the film thickness on the basis of the relationship between the condition of the interference fringe and the film thickness.

Next, a detailed description of specific operative examples of the method and the instrument of this invention.

For continuous, on-line measurement of the thickness of the polymer film, it is impossible to adopt such a conventional method of obtaining the interference fringe spectrum by an infrared spectrometer. Therefore, it is a requisite for the present invention to rapidly obtain the interference fringe by high-speed spectroscopic separation (hereinafter referred to simply as separation) of infrared light which involves a high-speed spectrum scan over a predetermined infrared wave-length range so that on-line, continuous measurement can be achieved. By using an interference fringe spectrum signal thus obtained by the high-speed infrared light separation and an infrared wavelength signal, the film thickness is measured by high-speed arithmetic processing following the relationship equation between the interference fringe and the film thickness, with the refractive index of the polymer film used as a constant.

An instrument for carrying such a method of this invention into practice basically comprises a high-speed infrared light separating unit for detecting the interference fringe wavelength spectrum and a high-speed processing unit for high-speed arithmetic processing the film thickness from the wavelength spectrum of the interference fringe and, if necessary, the infrared wavelength signal.

For the high-speed infrared light separation, there are the following two methods:

(1) An infrared light from an infrared radiation source, such as a tungsten lamp or a nichrome wire, is directed perpendicularly or obliquely to the polymer film to be measured without being spectroscopically separated into a monochromatic light, and the infrared light transmitted through or reflected by the film is rapidly separated into a light spectrum, which is detected by an infrared detector, thereby obtaining the interference fringe spectrum.

(2) An infrared light from an infrared radiation source is rapidly separated into a light spectrum beforehand, and the resulting monochromatic infrared light are scanned in wavelength with time and successively applied to the polymer film perpendicularly or obliquely thereto, and the infrared light transmitted through or reflected by the film is detected by the infrared detector, thereby obtaining the interference fringe spectrum. As the infrared light separating means for the high-speed infrared light separation in the abovesaid two methods, a diffraction grating, prism or like optical dispersing element can be used, but it is also possible to adopt such a method that a continuous-wavelength, variable narrow-band interference filter is rotated or oscillated within a certain angular range in front of the light source or the infrared detector. Also it is possible to scan the infrared light in wavelength with time by the abovesaid optical dispersing element and to successively detect infrared lights of different wavelengths by a single detector; furthermore, it is possible to employ such a method in which monochromatic infrared lights divided from the infrared light are focused on a detector array having a number of closely arranged infrared detectors and the infrared lights of the respective wavelengths are simultaneously detected by the respective detecting elements. The arrangement for the high-speed infrared light separation is roughly divided into two, such as follows:

(a) An arrangement in which an unseparated infrared light is cast on a film to be measured and an interference light produced by the film is separated at high speed and the separated lights are each detected by an infrared detector, thereby to obtain an interference fringe spectrum; namely, this arrangement comprises a light projecting unit and a light separating and detecting unit.

(b) An arrangement in which a chromatic light separated from an infrared light at high speed is cast on a film to be measured and an interference light produced by the film is detected by an infrared detector, thereby to obtain an interference fringe spectrum; namely, this arrangement comprises a spectrum projecting unit and a detecting unit.

When selecting, as the infrared wavelength range for the infrared light separation, a wavelength range that infrared light is not so much absorbed by the film, so as to measure the interference fringe spectrum with high accuracy, and considering that the film thickness can be measured regardless of the kinds of the light source, the detector and the film, it is preferred to employ infrared lights within the wavelength range from 0.8 to 2.2μ. The reason is as follows: In this wavelength range, the number of infrared absorption peaks of the polymer film is usually small, and even if the absorption peak exists, the absorption coefficient is small, so that the thin polymer film can be regarded as transparent to the infrared light of this wavelength range; further, an ordinary photo transistor made of silicon or germanium or an infrared detector of lead sulfide which is operable at room temperature can be used as the detector. However, the wavelength range to be used is not limited specifically to the range of 0.8 to 2.2μ, but it is possible that in accordance with the kind of film whose thickness is to be measured, a range of wavelengths of small absorption by the film is suitably selected. For example, it is possible to use, in addition to the wavelength range of 0.8 to 2.2μ, wavelength ranges of 2.4 to 3.2μ and 4.2 to 6.8μ for a polyethylene film, 2.4 to 3.2μ and 4.0 to 5.5μ for a polyethylene vinyl acetate film and 2.4 to 3.2μ and 4.0 to 6.8μ for a polyvinylidene chloride film. Further, an infrared wavelength range of longer wavelengths can also be used in accordance with the kind of the infrared radiation source of the infrared radiation detector used and the film thickness.

With the interference type film thickness measuring method, it is possible to measure a thickness about one half of the wavelength used; accordingly thin films can be measured by using short wavelengths. In the case of the polymer film, however, its thickness variation in a spot range of the film is about 0.4μ, so that if a wavelength of less than 0.8μ is employed, a clear interference waveform cannot be obtained due to cancellation, in that area of the polymer film irradiated by the infrared light beam, under the influence of the small variations in the film thickness, and consequently no accurate measurement can be performed. Further, the wavelength of less than 0.8μ is the lower limit of the infrared radiation, and shorter wavelengths are close to visible light and the measurement is very likely to be affected by external light. The longer the infrared wavelength used is, the larger the amplitude of the resulting interference fringe is, so that an output of good SN ratio can be obtained and the period of the interference fringe becomes large, resulting in the measurement becoming easier. In view of this, it is preferred that the wavelength used is long. With wavelengths exceeding 2.2μ, a relatively large number of absorption peaks appear in the case of the polymer film. Therefore, it is desirable, for general purposes, to use wavelengths of less than 2.2μ regardless of the kind of film to be measured.

The interference fringe spectrum signal obtained by high-speed separation of the infrared light of such a wavelength range is used as data for arithmetic processing of the film thickness together with the infrared wavelength signal. That is, for the arithmetic processing of the film thickness, the following two methods can selectively employed:

(1) High-precision film thickness processing method

With this method, the wave number interval $\Delta \nu$ for the film thickness measurement by the aforesaid equation (4) is obtained from the two infrared wavelengths $\lambda_A$ and $\lambda_B$ representing maximums or minimums of the interference fringe by the following equation:

$$\Delta \nu = 1/m(1/\lambda_B - 1/\lambda_A) \qquad (5)$$

In this case, when a pair of wavelengths of adjacent maximums or minimums of the interference fringe are selected, the difference in the order of the interference fringe m is 1.

If the high-speed infrared separation is performed by a wavelength scan at equal wave number intervals, the interference fringe spectrum is detected at equal time intervals; therefore, if the wave number scanned per unit time is known, the value of the wave number interval $\Delta \nu$ can easily be obtained by measuring the time intervals between the maximums or minimums of the interference fringe spectrum. Further, in the case where the high-speed infrared separation is carried out by a wavelength scan at regular or irregular wavelength interval, it is necessary to obtain the infrared wavelength representing the maximum or minimum of the interference fringe spectrum by utilizing the infrared wavelength signal.

(2) Low-precision film thickness processing method

This method is to obtain an apparent interference fringe wave number difference $\Delta va$ from the number of maximums or minimums of the interference fringe spectrum within a predetermined infrared wavelength range or the sum of the maximums and the minimums. This apparent interference fringe wave number difference $\Delta va$ is obtained as follows:

$$\Delta va = \Delta vR/N \quad (6)$$

where $\Delta vR$ is a difference between a maximum wave number and a minimum one in a predetermined infrared wavelength and N is the number of maximums or minimums of the interference fringe spectrum within the range of $\Delta vR$. Alternatively, $$\Delta va = 2\Delta vR/N' \quad (7)$$

where N' is the sum of the numbers of maximums and the minimums of the interference fringe spectrum within the range of $\Delta vR$. In both cases of the equation (6) and (7), the interference fringe does not always become maximum or minimum at the wavelengths at both ends of the predetermined infrared wavelength range, so that $\Delta va$ obtained by each of the above two equations includes an error as compared with the actual $\Delta v$, but an approximate value of the film thickness can be measured only by counting the number of maximums and/or minimums within the wavelength range. Accordingly, this processing is easier than the processing of determining the wavelength as in the abovesaid high-precision film thickness processing method. In addition, if the infrared wavelength range is selected to be 1.0 to 2.0μ (10,000 to 5000 cm$^{-1}$ in terms of the wave number), films about 10μ thick can be measured with an error of 0.5 to 1.0μ; this is accurate enough for practical use.

By obtaining the wave number interval $\Delta v$ of the interference fringe using either one of the high- and low-precision film thickness processing method, the thickness of the polymer film can be measured.

BRIEF DESCRIPTION OF THE DRAWINGS

FIG. 2 is a diagram illustrating an example of the infrared interference type film thickness measuring instrument of this invention in which a spectrum detecting unit and a light projecting unit are disposed on the same side of a film to be measured;

FIG. 4 is a diagram illustrating another example of the infrared interference type film thickness measuring instrument of this invention in which the light projecting unit and the spectrum detecting unit are disposed on opposite sides of the film to be measured;

FIG. 5 is a diagram illustrating another example of the infrared interference type film thickness measuring instrument of this invention in which the spectrum projecting unit and the detecting unit are disposed on opposite sides of the film to be measured;

FIG. 6 is a block diagram showing another example of the infrared interference type film thickness measuring instrument which includes a processing unit;

DESCRIPTION OF THE PREFERRED EMBODIMENTS

Figure 1:
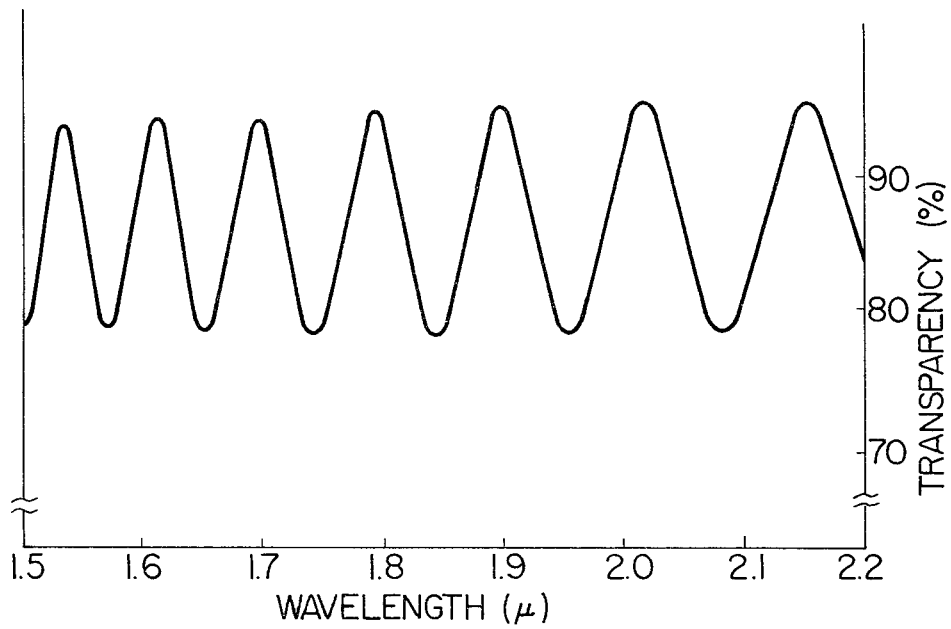
FIG. 1 is a diagram showing an example of an infrared interference fringe spectrum of a polyvinylidene chloride 10.5μ in thickness.

Reference is made first to FIG. 2. Infrared rays emitted from an infrared source 1 are converted by a lens system 2 into a parallel beam and passed through a semitransparent mirror 3, then projected on a polymer film 5 whose thickness is to be measured, via a filter 4 which intercepts visible rays but passes only infrared rays within a required range of wavelengths.

The infrared wavelength differs with the kind of the infrared source 1 used; for obtaining infrared wavelength shorter than 2.5μ, a tungsten lamp is preferred, whereas for the longer wavelengths, a nichrome wire or globar lamp is suitable. The lens system 2 is provided to convert the infrared rays from the infrared source 1 into a parallel beam, and hence may be a parallel ray optical system employing a concave mirror. The semitransparent mirror 3 passes the beam directed thereto via the lens system 2 from the infrared source 1, while at the same time serving to direct infrared light from the film 5 to the next spectral optical system. Since the film 5 is a parallel-surfaced thin film, the light incident thereon undergoes interference because of the multiple reflection in the film 5. The infrared light thus subjected to the interference by the film 5 is cast therefrom upon a corner cube 6. The corner cube 6 is to reflect the incident beam back along the same optical path as the incoming beam, and such means may include optical means capable of reflecting the incident infrared light back in the direction opposite to the direction of incidence.

In order to continuously measure the thickness of a polymer film moving on a manufacturing production line, it is necessary to dispose a pair of measuring means above and below the film 5 and to drive them to move across the film 5. With such an arrangement, however, it is very likely that a positional or angular deviation occurs between the both measuring means due to variations in their travelling speed or the like; if such occasion arises, an ordinary reflector reflects the incident infrared light back in a direction different from the direction of incidence, so that the deviation in the optical axis between the incident and the return beam cannot be eliminated. With the use of the corner cube 6, however, it is possible to avoid such a deviation in the optical axis and hence assure accurate continuous measurement of the thickness of the film 5 in its widthwise direction. In other words, the infrared light reflected by the corner cube 6 is cast on the film 5 again along exactly the same light path as the incident light. The point of incidence on the film 5, in this case, is identical with the point from which the infrared light leaves the film 5 towards the corner cube 6. While passing through the film 5 twice, the infrared light is subjected to the interference by the film 5, and the interference fringe is amplified to be made clear as compared with an interference fringe of an infrared light having passed through the film 5 only once, so that the accuracy of measurement is further enhanced.

The infrared light having thus transmitted through the film 5 passes through the filter 4 again and is reflected by the semitransparent mirror 3 to be directed to a spectrum detecting unit 15 which is high-speed spectroscopic scanning optical system. The spectrum detector unit 15 comprises a suitable combination of known optical elements and may be an optical system employing a diffraction grating or prism as an optical dispersing element, or an optical system utilizing a variable-wavelength, narrow-band interference filter. In FIG. 2, the spectrum detecting unit 15 is shown to be a high-speed spectroscopic scanning optical system employing a diffraction grating. The infrared light reflected by the semitransparent mirror 3 is reflected by an vibrating mirror 7, oscillated by an optical scanner 8, so that the light is directed to and incident on a diffraction grating 9 while continuously varying in the angle of incidence with time. The vibrating mirror 7 and the optical scanner 8 for oscillating it over a predetermined angular range may be substituted with a combination of a multi-faced mirror and a drive motor therefor. The diffraction grating 9 is selected in accordance with the range of wavelengths used. By making constant the angle of diffraction of the infrared light from the diffraction grating 9 and varying with time the angle of incidence of the light on the diffraction grating 9 by the optical scanner composed of the vibrating mirror 7 and the optical scanner 8, a chromatic infrared light thus scanned in wavelength in terms of time is diffracted to be directed towards the next detection system.

The monochromatic light from the diffraction grating 9 is reflected by a mirror 10 towards a concave mirror 11 and is further reflected thereby to focus on an infrared detector 12. A change in the intensity of infrared light is converted by the infrared detector 12 into an electrical signal, such as a voltage, which is applied to a high-speed arithmetic unit 18. In the above, the high-speed infrared light separating means may also be such an arrangement that monochromatic infrared lights spatially separated spectroscopically from the infrared light by a dispersion element, are respectively imaged on small detector elements of a detector array to obtain required interference fringe spectrums at the same time.

The infrared source 1, the lens system 2 and the filter 4 forms a light projector 13, and the light projector 13, the corner cube 6 and the spectrum detector 15 make up a high-speed infrared light spectroscopic scanning unit 7. The light projecting unit 13 and the spectrum detecting unit 15 are disposed on the same side with respect to the film 5; therefore, by fixing them relative to each other, the light reflected by the semitransparent mirror 3 is always directed to the spectrum detecting unit 15 along the same light path, ensuring stable measurements of film thickness. The corner cube 6 may be in the form of a prism cut out of a corner of a cube of glass or quartz, or in the form of a mirror comprising three plane mirrors assembled together at right angles to one another. It is also possible to measure the film thickness using only the reflected light from the film 5 without employing the corner cube 6 in the apparatus of this invention shown in FIG. 2; this is practised when the corner cube cannot be disposed in opposing relation to the light projector 13 across the film 5. Also it is possible that the infrared light reflected from the semitransparent mirror 3 is guided by an optical fiber to the spectrum detecting unit 15 at a position remote from the travelling part. The use of the optical fiber is effective for fast infrared light spectroscopic scanning of high accuracy and for reduction of the weight of the travelling measuring part.

Figure 3:
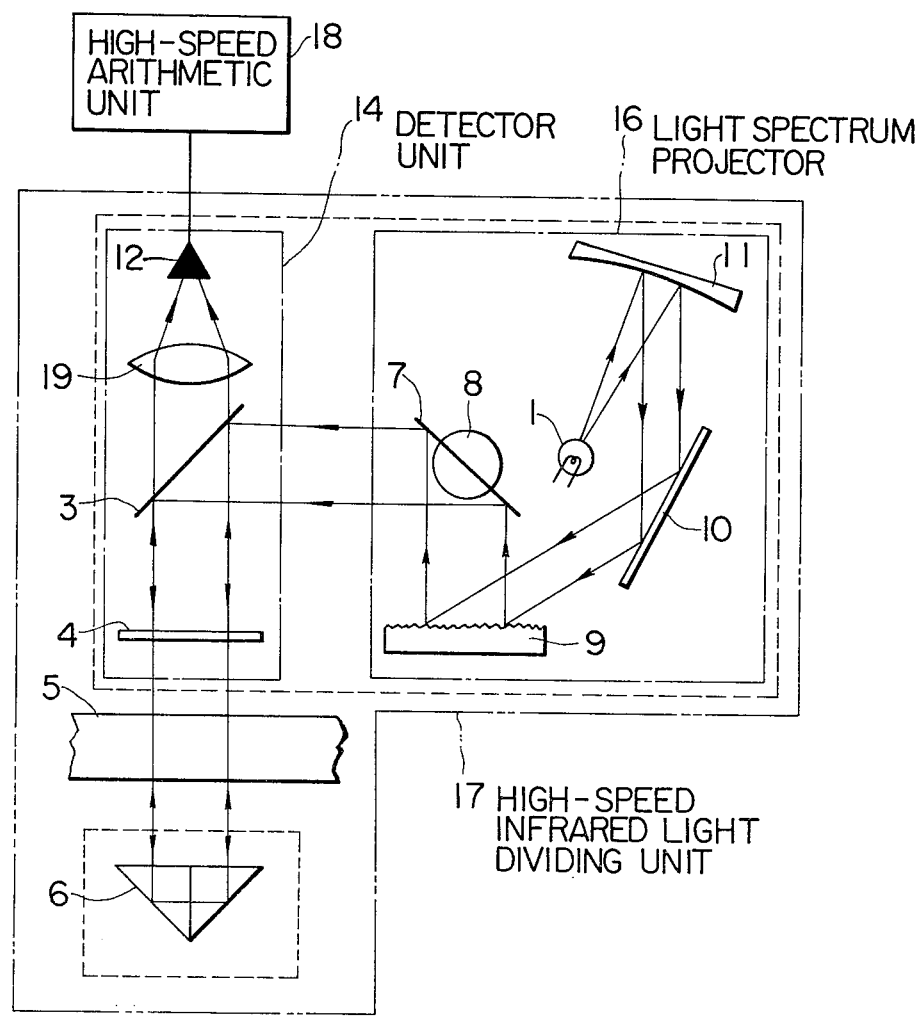
FIG. 3 is a diagram illustrating another example of the infrared interference type film thickness measuring instrument of this invention in which a spectrum projecting unit and the detecting unit are disposed on the same side of the film to be measured.

FIG. 3 illustrates an optical arrangement corresponding to the design (b) mentioned previously. In the infrared interference type film thickness measuring instrument employing the illustrated optical arrangement, infrared light rendered monochromatic by a spectrum projecting unit 16 is scanned fast in wavelength with time, and monochromatic lights of different wavelengths are each reflected by the semitransparent mirror 3 to pass through the film 5 twice travelling along the same light path as shown in FIG. 2, and the light having thus undergone interference twice by the film 5 passes through the semitransparent mirror 3 and a lens system 19, then it is detected by an infrared detector 12. A change in the brightness of the interference fringe thus detected by the infrared detector 12 is applied to the high-speed arithmetic unit 18 together with a signal representing the wavelength of the chromatic light. Also in the infrared interference type film thickness measuring instrument of this embodiment, it is possible to adopt the arrangement that dispenses with the corner cube or employs an optical fiber, as is the case with the embodiment described previously in respect of FIG. 2. In FIG. 3, the filter 4, the lens 19 and the infrared detector 12 constitute a detector unit 14. The spectrum projecting unit 16 can be obtained by providing, for example, the infrared source 1 in place of the infrared detector 12 in the light spectrum detecting unit 15 of FIG. 2, as depicted in FIG. 3.

It is also possible to dispose the light projecting unit 13 and the spectrum detecting unit 15 on both sides of the high molecular film 5 respectively, as shown in FIG. 4; namely, the infrared light from the projector 13 passes through the polymer film 5 and then enters the spectrum detecting unit 15. This arrangement is of particular utility when employed in the case where travelling means carrying the light projecting unit 13 and the spectrum detecting unit 15 respectively travel with high accuracy so that no deviation occurs in the optical axis between the incoming light to the film 5 and the outgoing light therefrom, or in the case where the light projecting unit 13 and the spectrum detecting unit 15 respectively disposed on both sides of the film 5 can be fixed relative to each other. Also in this case, it is possible to fix the spectrum detecting unit and to travel the measuring instrument so that the interference light is led via an optical fiber to the spectrum detecting unit.

Further, it is also possible to dispose the spectrum projecting unit 16 and the detector 14 on both sides of the polymer film 5, as shown in FIG. 5. This arrangement also produces the same effects as those obtainable with the embodiment of FIG. 4.

Referring next to FIG. 6, a specific operative example of the processing unit 18 will hereinunder be described, which employs the high-speed infrared spectroscopic scanning optical system 17 shown in FIG. 2. A sine-wave signal from a sine-wave generator 21 is applied via a power amplifier 22 to a drive circuit 23, which in turn drives the optical scanner 8 to oscillate the vibrating mirror 7 with a period of 20 to 60 milliseconds, for example. For each movement of the vibrating mirror 7 in one direction, wavelength of, for example, 1.5 to 2.2$\mu$ are scanned, and monochromatic lights of such wavelengths are successively obtained. The monochromatic lights thus obtained are each converted by the infrared detector 12 into an electrical signal, and this electrical signal, i.e. an interference waveform signal is amplified by an infrared detecting circuit 24, if necessary, and applied to a waveform shaper 25 formed, for instance, with a high-pass filter for removal of noises, thereafter being provided to an A-D converter 26. The input analog signal to the A-D converter 26 is converted thereby into, for example, an 8-bit digital signal. The interference waveform signal thus converted into digital form is supplied to a microcomputer 27 for storage therein.

The microcomputer 27 performs an arithmetic operation for obtaining the film thickness for each spectrum scan by the vibrating mirror. For this arithmetic operation, the input digital signal from the A-D converter 26 must be coordinated with the wavelength in the spectrum scan. To perform this, such arrangement is made that, for example, a pulse is produced when the vibrating mirror 7 assumes a predetermined angular position; namely, a pulse is generated when a predetermined wavelength is scanned. This pulse is generated by a pulse generator 28 and applied as an arithmetic operation start signal to the microcomputer 27. In other words, during forward stroke of the vibrating mirror 7 the interference waveform signal from the detector 12 is applied to the computer 27, and during the backward stroke of the vibrating mirror 7 an arithmetic operation of the interference waveform signal is performed.

In the arithmetic operation, maximums or minimums (or peaks or valleys) of the interference waveform signal are detected, then the film thickness is computed by the aforementioned equation (4) which is a relationship equation between the condition of interference and the film thickness. In the case of a low-accuracy film thickness calculation, the number of maximums or minimums or the sum of them is detected, and the wave number interval is obtained using the aforementioned equation (6) or (7), then the computation of the equation (4) is achieved using the wave number interval.

By the way, detection of the maximum or minimum of the interference waveform signal can be performed in the same manner as that for obtaining a maximum or minimum of an input signal in various digital processors. For the calculation of the equation (4), it is necessary to obtain wavelengths corresponding to the maximums or minimums. In this case, the wavelength corresponding to the maximum or minimum of the interference waveform signal for the film whose thickness is to be measured can be calculated on the basis of variations in the interference waveform signal with time in respect of a standard film of known thickness and the wavelength of each maximum or minimum. It is preferred to utilize memory addresses as the variations in the interference waveform signal with time. For example, the interference waveform signal is stored in the microcomputer 27 at predetermined addresses in synchronization with pulses from the pulse generator 28, that is, in synchronization with the spectrum scan. Thus, the memory address and the wavelength at the time of the signal being stored are coordinated with each other, and the wavelength of the maximum or minimum can be obtained from the address where the maximum or minimum of the interference waveform was stored. In a similar manner, the interference waveform signal for the standard film is stored. Since the thickness of the standard film is known, the wavelengths at which the maximum and the minimum of the interference waveform are obtained, are also known; accordingly, from those of the address having stored therein the interference waveform signal for the standard film at which the maximum and the minimum are obtained and the preknown wavelengths, coordination of the wavelengths and the addresses can easily be obtained.

Figure 7:
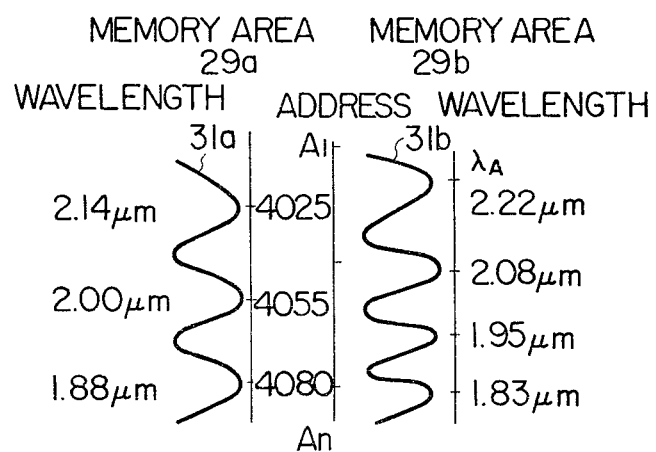
FIG. 7 is a diagram showing the relationships between memory addresses and waveforms.

For example, as shown in FIG. 7, the interference waveform signal is stored in addresses $A_1$ to $A_n$, and in a memory area 29a of each address there are stored eight bits of the interference waveform signals for the standard film, whereas in a memory area 29b, eight bits of the interference waveform signal for the film to be measured are stored. In FIG. 7, the values stored in the memory areas 29a and 29b are shown in the form of waveforms 31a and 31b respectively. It is known beforehand that maximums of the interference waveform signal for the standard film are obtained at wavelengths, for example, of $2.14\mu$, $2.00\mu$ and $1.88\mu$. By obtaining the maximums of the interference signal for the standard film, the addresses 4025, 4055 and 4080 where the maximums are stored, are detected; thus the coordination of the addresses and the wavelengths is obtained.

By obtaining the maximums of the interference waveform signals for the film being measured and by a calculation based on the addresses having stored therein the maximums and the coordination of these addresses and the wavelengths, it is detected that the wavelengths at which the maximums are obtained are $2.22\mu$, $2.08\mu$, $1.95\mu$ and $1.83\mu$. In this case, it is preferred to use the so-called interpolation so as to enhance the calculation accuracy. Letting $\lambda_A$ and $\lambda_B$ in the equation (4) be $2.22\mu$ and $1.83\mu$ respectively, $m=3$.

Figure 8:
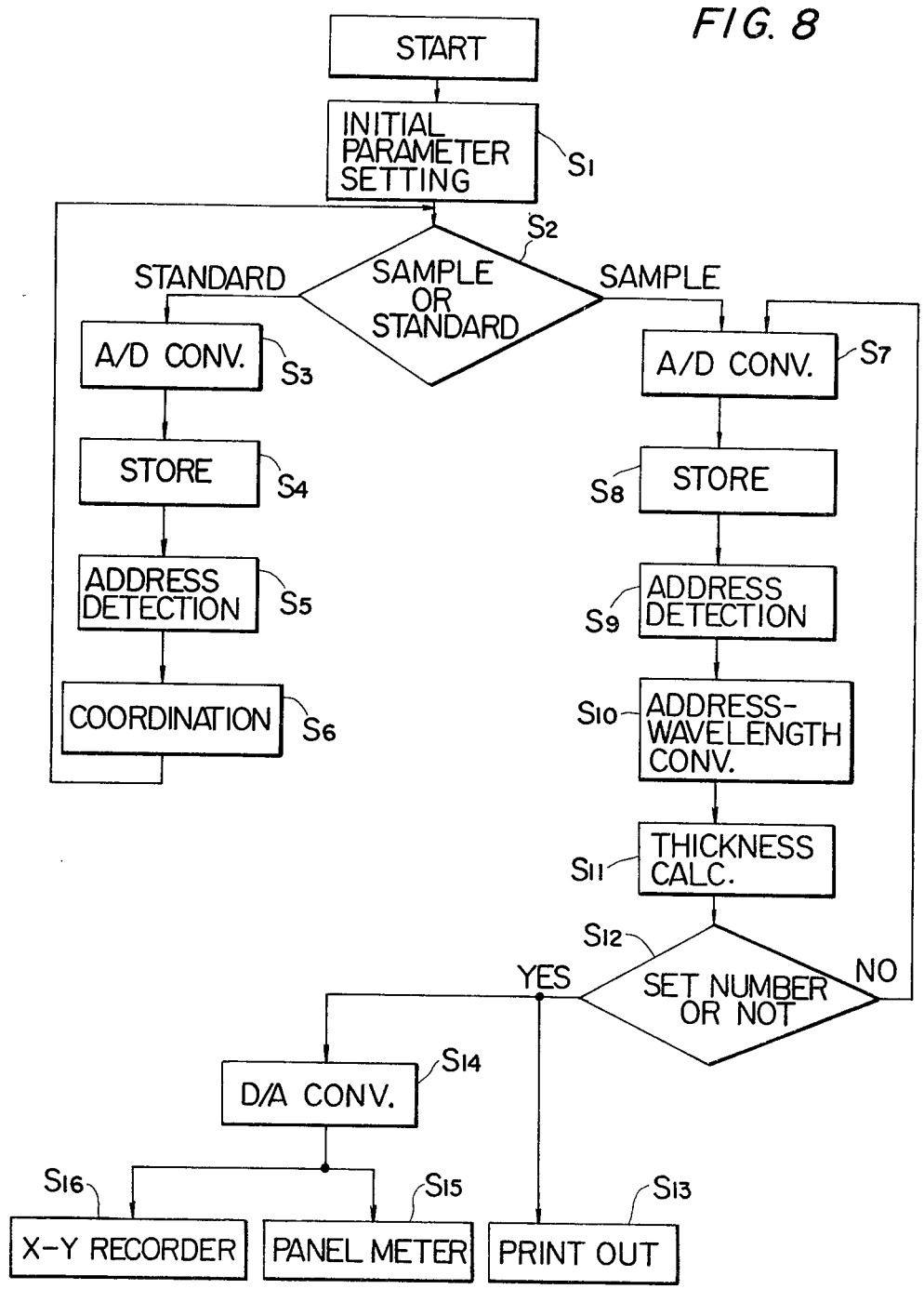
FIG. 8 is a flow chart showing an example of operation in the processing unit.

Referring next to FIG. 8, a description will be given of an example of a flow chart of a program which is executed by the computer 27 shown in FIG. 6. Upon starting, there is achieved initial setting of various parameters, such as the sampling intervals in the A-D converter 26, the refractive index of a film or sample to be measured, wavelengths representing the extreme points (maximum or minimum) of the interference wavelength signal of the standard film, the number of measurements and so forth, are performed in step $S_1$. Then, in step $S_2$ it is checked whether the sample film is the standard one or the film to be measured. In the case of the standard film, the operation proceeds to step $S_3$, in which the interference waveform signal is converted into a digital signal, which is stored in the memory area 29a of each of the addresses $A_1$ to $A_n$ in step $S_4$. Thereafter, in step $S_5$ the stored interference waveform signal is read out, and the addresses where the extreme points, that is, the maximums or minimums, or both of them are obtained are detected. Next, in step $S_6$ coordination of the addresses and the wavelengths is calculated from the detected addresses and the initially set wavelengths of the standard film, and is then stored. Then, the operation returns to step $S_2$.

When it is checked in step $S_2$ that the film is one to be measured, the operation proceeds to step $S_7$, in which the interference waveform signal is converted into a digital signal, which is stored, in step $S_8$, in the memory area 29b of each of the memory addresses $A_1$ to $A_n$ where the waveform of the standard film was erased. After one wavelength scanning, the memory areas 29b of the addresses $A_1$ to $A_n$ are read out in step $S_9$, detecting the addresses for the points of extreme values of the interference waveform signal. Then, in step $S_{10}$ the detected addresses are each converted into a wavelength on the basis of the coordination of the address with the wavelength. In step $S_{11}$, the film thickness is calculated from the converted wavelength on the basis of the equation (4), and the calculation result is stored.

Then, in step $S_{12}$ it is decided whether or not the number of film thickness calculations is equal to the number of measurements initially set. If not, the operation returns to step $S_7$. If it is checked in step $S_{12}$ that the number of measurements has reached the initially set number, the mean value of the film thickness obtained until then is calculated, and the calculation result is printed in step $S_{13}$. Then, in step $S_{14}$ the mean value of the film thickness thus obtained is converted into an analog signal, which is indicated by a meter in step $S_{15}$ and, at the same time, supplied to an X-Y recorder or the like in step $S_{16}$.

Accordingly, also in the arrangement of FIG. 7 there are provided a printer 32 for printing the film thickness obtained in the microcomputer 27 and a D-A converter 33 for converting the film thickness into analog form. The output from the D-A converter 33 is provided to a meter 34 and an X-Y recorder 35. One or more of the printer 32, the meter 34 and the recorder 35 may also be left out. In FIG. 8, steps $S_3$, $S_4$ and $S_5$ are executed in the same routine as steps $S_7$, $S_8$ and $S_9$ respectively.

Next, a description will be made in connection with an embodiment of this invention actually carried into practice. A tungsten lamp was used as the infrared source, and the arrangement of optical instruments was same as that shown in FIG. 2. An non-chromatic infrared light was directed to an about $10\mu$ thick plastic film "Saran"(Trade name, a polyvinyldene chloride film by Asahi-Dow K.K.) to measure its thickness. The optical scanner 8 for driving the vibrating mirror 7 was made of a scanning galvanometer type one which was driven with a frequency of 20 to 30 vibrations per sec.; the diffraction grating 9 had 600 lines per mm.; the infrared detector 12 was one made of lead sulfide (PbS); and the corner cube 6 was a quartz one. An infrared spectral range of 1.5 to $2.2\mu$ was scanned. An interference fringe spectrum signal from the infrared detector 12 was converted by the A-D converter 26. As the microcomputer 27, M 6800 Microcomputer System by Motorola Inc. was used for storage and for the film thickness calculation. The film thickness value thus obtained was printed out, and displayed on an X-Y recorder after being converted by a D-A converter into analog from. As a result, variations in the thickness of the "Saran" film could accurately be measured with a resolving power of $0.2\mu$.

As has been described in detail in the foregoing, the infrared interference type film thickness measuring method and instrument of this invention are epoch-making in that they positively utilize the interference phenomenon which has heretofore been the cause of an error in film thickness measurements using infrared absorption of a film. With the present invention, high-speed processing is performed on the basis of the relationship between an interference fringe spectrum obtained by rapidly spectroscopically scanning an infrared interference fringe spectrum by a thin polymer film and its thickness, thereby to measure the film thickness, so that the thickness of a thin polymer film which has heretofore been difficult to measure in the prior art can continuously be measured in a non-contact manner and on the on-line or off-line basis. Therefore, the present invention is very useful for quality control of polymer films on their manufacturing production line, and hence is of great industrial value.

It will be apparent that manu modifications and variations may be effected without departing from the scope of the novel concepts of this invention.

What is claimed is:

1. An infrared interference type film thickness measuring method in which infrared light is irradiated to a polymer film having a thickness of less than $30\mu$, the infrared light before or after irradiation is spectroscopically scanned within a wavelength range of substantially small absorption by the film, an infrared interference fringe spectrum based on the polymer film is formed, at least the extreme points of the infrared interference fringe are detected by processing, thereby to measure the thickness of the polymer film.

2. An infrared interference type film thickness measuring method according to claim 1, wherein non-chromatic infrared light is irradiated to the polymer film and the infrared light after irradiation is spectroscopically separated into monochromatic infrared lights with time, thereby to obtain the interference fringe spectrum.

3. An infrared interference type film thickness measuring method according to claim 1, wherein the infrared light is spectroscopically separated with time and irradiated to the polymer film to obtain the interference fringe from the infrared light after irradiation.

4. An infrared interference type film thickness measuring method according to claim 1, wherein the infrared light is transmitted through the polymer film at the same portion a plurality of times.

5. An infrared interference type film thickness measuring method according to claim 1, wherein at least two infrared wavelengths representing maximums or minimums and a difference in the interference order between the maximums or minimums are detected by processing to thereby calculate the film thickness.

6. An infrared interference type film thickness measuring method according to claim 1, wherein the number representing the maximums and/or minimums of the interference fringe spectrum is detected by processing to thereby calculate the film thickness.

7. An infrared interference type film thickness measuring method according to claim 1, wherein the infrared light is selected within a wavelength range of 0.8 to $2.2\mu$.

8. An infrared interference type film thickness measuring instrument comprising;
   an infrared radiation source for irradiating a polymer film having a thickness of less than $30\mu$ with infrared light;
   an infrared light separating means for spectroscopically separating, with time, the infrared light before or after irradiation in a wavelength range of essentially small absorption by the film to obtain an interference fringe spectrum from the infrared light after irradiation;
   an infrared radiation detector receiving the interference fringe spectrum to detect it as an electrical interference waveform signal; and
   a processing unit for detecting at least the extreme points of the interference waveform signal from the infrared radiation detector to calculate the film thickness.

9. An infrared interference type film thickness measuring instrument according to claim 8, wherein means is provided for transmitting the infrared light through the polymer film at the same portion a plurality of times.

10. An infrared interference type film thickness measuring instrument according to claim 9, wherein the means for transmitting the infrared light through the polymer film a plurality of times is reflector means disposed in opposing relation to the infrared radiation source across the polymer film for reflecting the incident infrared light back in the direction of incidence.

11. An infrared interference type film thickness measuring instrument according to claim 10, wherein the reflector means is a corner cube.

12. An infrared interference type film thickness measuring instrument according to claim 8, wherein an A-D converter is provided for converting the interference waveform signal from the infrared radiation detector into a digital signal, and wherein the processing unit is a digital processor supplied with the output from the A-D converter.

13. An infrared interference type film thickness measuring instrument according to claim 12, wherein the processing unit detects, by processing, at least two infrared wavelengths representing maximums or minimums of the interference waveform signal and a difference in the interference degree between the maximums of minimums and calculates therefrom the film thickness.

14. An infrared interference type film thickness measuring instrument according to claim 12, wherein the processing unit calculates the wavelengths for maximums or minimums of the output from the infrared radiation detector on the basis of variations, with time, in the interference fringe spectrum of a polymer film of known thickness and wavelengths representing maximums or minimums of the interference fringe spectrum.

15. An infrared interference type film thickness measuring instrument according to claim 14, wherein addresses of a memory for storing the output from the A-D converter are coordinated with infrared wavelengths.

16. An infrared interference type film thickness measuring instrument according to claim 15, wherein the start of calculation by the processing is synchronized with the infrared light separating means.

17. An infrared interference type film thickness measuring instrument according to claim 15, wherein the memory has stored therein information representing the variations, with time, in the interference fringe spectrum of the polymer film of known thickness.

* * * * *